US012388145B2

(12) United States Patent
Handing et al.

(10) Patent No.: US 12,388,145 B2
(45) Date of Patent: Aug. 12, 2025

(54) BATTERY TRAY

(71) Applicant: BENTELER AUTOMOBILTECHNIK GMBH, Paderborn (DE)

(72) Inventors: Christian Handing, Langenberg (DE); Kai Michel, Salzkotten (DE); Stefan Schmitz, Bielefeld (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 18/942,777

(22) Filed: Nov. 11, 2024

(65) Prior Publication Data

US 2025/0158199 A1 May 15, 2025

(30) Foreign Application Priority Data

Nov. 13, 2023 (EP) .................................... 23209510

(51) Int. Cl.
*H01M 50/249* (2021.01)
*H01M 50/244* (2021.01)

(52) U.S. Cl.
CPC ....... *H01M 50/249* (2021.01); *H01M 50/244* (2021.01)

(58) Field of Classification Search
CPC .......................... H01M 50/244; H01M 50/249
See application file for complete search history.

(56) References Cited

U.S. PATENT DOCUMENTS 5,555,950 A * 9/1996 Harada ............... H01M 50/209 180/68.5
10,780,926 B2 9/2020 Lee et al.

FOREIGN PATENT DOCUMENTS

| | | |
|---|---|---|
| DE | 102018126068 A1 | 4/2020 |
| DE | 102021000361 A1 | 3/2021 |
| EP | 3468821 B1 | 8/2020 |

OTHER PUBLICATIONS

Extended European research report, European Application No. 23209510.9, mailed Apr. 30, 2024, 10pp.

* cited by examiner

*Primary Examiner* — Maria Laios
*Assistant Examiner* — Jordan E Berresford
(74) *Attorney, Agent, or Firm* — HAUPTMAN HAM, LLP

(57) ABSTRACT

A battery tray for holding battery elements for providing electrical energy in electrically powered vehicles. The battery tray has a battery pan having a reinforcing structure which is arranged on the outside in front of a side wall of the battery pan. The reinforcement structure has a hollow profile with a first upper leg with a first opening and a second lower leg with a second opening. A sleeve extends between the vertically spaced legs and connects the openings in the legs. A fitting plate covers the first opening in the first leg, wherein the fitting plate has a passage through which the sleeve is guided with a sleeve section.

15 Claims, 5 Drawing Sheets

BATTERY TRAY

RELATED APPLICATIONS

The present application claims priority of European Application Number 23209510.9 filed Nov. 13, 2023, the disclosure of which is hereby incorporated by reference herein in its entirety.

FIELD

The present disclosure relates to a battery tray.

BACKGROUND

Battery trays, which are arranged between the axles of the vehicle, are used to hold battery elements for providing electrical energy in electrically powered vehicles. One of the safety requirements for a battery tray is good crash performance. In order to satisfy this requirement, the battery tray is protected by an external reinforcing structure.

DE 10 2018 126 068 A1 describes a battery tray for an electric vehicle part. The battery tray has a battery pan which is inserted into an outer frame and is closed by a lid. The frame is produced in cross section from at least two profile components joined together, wherein at least one of these profile components is produced as a sheet metal formed component.

EP 3 468 821 B1 describes a battery box for a motor vehicle with a structural frame that functions as a reinforcing structure. The structural frame is able to be connected to a motor vehicle body via fasteners, wherein the fasteners are designed as sleeves. The sleeves extend between a top and a bottom of a fastening section in a profile segment of the structural frame and are held in a form-fitting manner against lateral displacement.

The battery trays have to be mechanically stable and fastened to the body or chassis of a vehicle. The battery pan is to be integrated as extensively as possible into the body, which presents design and assembly challenges.

The outer reinforcing structure in front of a side wall of the battery pan includes several components as well as installation and attachment parts. These are welded to one another and to the battery pan. The high number of individual components and the multitude of welded joints is able to result in warping in the welded construction. The high number of individual components also results in an increase in tolerances or tolerance chains. These, as well as any welding warpage, have to be compensated for in order to ensure a connection capable of mass production of the battery pan in a motor vehicle. The battery tray itself is attached to the body or chassis of a vehicle using fasteners, usually screw fasteners. The battery tray is secured to side sills and, if necessary, floor cross members in the motor vehicle. The screwing points form the interface to the vehicle body, so that high demands are placed on their positioning accuracy.

SUMMARY

The present disclosure is based on the object of creating a battery tray improved with respect to function and assembly with a flexible adjustment option and high positioning accuracy of the mounting points.

A battery tray for holding battery elements for providing electrical energy in electrically driven vehicles has a battery pan having a reinforcing structure which is arranged on the outside in front of at least one side wall of the battery pan. The reinforcing structure extends in the longitudinal direction of the side wall and includes a hollow profile, which is able to be formed from an inner profile and a locking plate. The inner profile and the locking plate form a box-shaped hollow profile at least over the majority of the length of the reinforcing structure. The inner profile is U-shaped in cross-section and has a rear web and a first upper leg and second lower leg. There is an opening in each leg. The web is oriented parallel to the side wall of the battery pan. The upper leg and the lower leg of the inner profile point away from the battery pan so that one open side of the inner profile is on the outside. The open side of the inner profile is closed by the locking plate, at least in sections.

The locking plate is able to be configured in a shell-like manner or profiled in the form of an outer shell with an outer wall and webs projecting towards the inner profile, for example, joining webs.

The hollow profile of the reinforcement structure is able to be a single-chamber profile or a multi-chamber profile. A sleeve is then able to be pushed from below through an opening in one leg and guided through the passage in the fitting plate.

Multiple sleeves are in the reinforcing structure according to at least one embodiment of the present disclosure. These are fastening or mounting sleeves, which are able to be cylindrical or in the form of rectangular tubes. Multiple sleeves are able to be arranged at a distance from one another, and are provided in the longitudinal direction of the reinforcing structure. A sleeve extends between the legs of the hollow profile over the entire height of the hollow profile. A sleeve connects the openings in the legs, wherein a sleeve portion, for example, a sleeve portion at the upper end of the sleeve, protrudes through the opening in the first upper leg. The sleeves are used to carry out fasteners through which the battery tray is secured in the body or chassis of a vehicle. According to at least one embodiment of the present disclosure, the battery tray is secured to side sills and, if necessary, floor members in the motor vehicle via the sleeves and suitable fasteners.

The openings in the legs are able to be self-contained and have a surrounding edge. The openings are able to, for example, be round.

An advantageous embodiment according to the present disclosure provides that at least one opening, for example, the first opening in the first upper leg, is open at the edge. According to at least one embodiment of the present disclosure, the opening is able to be a slot in the first leg, thus, an elongated opening in the first leg, wherein the opening starts from the free end of the leg. This slot-like or oblong hole-like opening is directed transversely to the longitudinal axis of the hollow profile in the first leg.

According to an embodiment of the present disclosure, a fitting plate with a passage for the sleeve is provided. The sleeve is guided through the passage with a sleeve section. The fitting plate covers the first opening in the first leg or the second opening in the second leg at least partially, or completely.

Covering means that the fitting plate encloses the sleeve with the passage and closes the remaining space between the edge of the opening and the sleeve. The fitting plate can lie on the leg or rest against the underside of the leg. In at least one embodiment of the present disclosure, a fitting plate overlaps or underlaps the opening in the first leg or the opening in the second leg. In at least one embodiment of the present disclosure, the fitting plate rests on the outside of the first leg. The fitting plate then rests with an overlap on the edge that defines the opening in the first leg.

The fitting plate is designed and intended to compensate for tolerances within the assembly of the reinforcement structure and/or to adjust the position of the sleeve in the hollow profile during or after assembly and before joining the sleeve. The fitting plate is used to compensate for tolerances and distances between the components of the reinforcement structure and serves as a positioning element for the sleeve in the reinforcement structure and thus for adjusting the mounting point and its position.

The fitting plate overlaps the edge surrounding or adjacent to an opening in the first leg or the second leg. If the fitting plate is positioned below the opening, the fitting plate underlaps the opening at the edge. The overlap or underlap is large enough so that the fitting plate and the sleeve guided through the passage is able to be positioned and aligned and the opening is covered by the fitting plate.

The fitting plate is able to be positioned in a recess in the leg. A recess is formed, for example, by a recess in one of the legs, for example, in the first leg.

In at least one embodiment of the present disclosure, the passage has a collar, for example, a self-contained, circumferential collar. With the collar, the passage encloses the outer circumference of the sleeve. This is advantageous both functionally and in terms of assembly technology.

In at least one embodiment of the present disclosure, the collar is directed outwards away from the hollow profile. However, the collar is able to be directed inwards into the hollow profile. In at least one embodiment of the present disclosure, if the fitting plate is provided on the inside of the hollow profile and rests against a leg on the inside of the hollow profile and covers the corresponding opening, the collar is directed inwards into the interior of the hollow profile.

In at least one embodiment of the present disclosure, the hollow profile includes an inner profile and a locking plate, wherein the inner profile is configured in a U-shaped cross-section with a rear web and the first leg and the second leg. The two legs of the inner profile are directed away from the battery tray, i.e., when viewed from the battery tray, they point outwards. The inner profile is closed at least in part lengthwise by the locking plate.

This design is functional and advantageous in terms of crash performance. The stiffness behavior of the reinforcement structure is load-optimized. The inner profile is easily accessible via the open side. This improves the functionality, such as the accessibility and the assembly of the inner profile itself, as well as the installation parts to be mounted in the inner profile. The inner profile and the locking plate complement each other synergistically to form the hollow profile of the reinforcement structure, which is advantageous due to static and dynamic load behavior. In at least one embodiment of the present disclosure, the rigidity of the reinforcing structure to the battery tray is high. The legs of the inner profile or the hollow profile are able to deform in the event of a side impact and energy dissipation, wherein the locking plate acts as a tension strut and holds the legs in position to a certain degree.

In at least one embodiment of the present disclosure, one sleeve or several sleeves are each guided with an upper sleeve section through the first opening in the first leg and protrude towards an outer side of the first leg. The sleeve or several sleeves are also able to be guided with a lower sleeve section through the second opening in the second leg and protrude towards an outer side of the second leg. The protruding or projecting section of the sleeve provides a connection surface for the material-locking connection to the fitting plate, for example, in the form of at least a partially circumferential weld seam or a positive and/or non-positive joining connection such as crimping or flanging.

In at least one embodiment of the present disclosure, the sleeves have an upper and/or a lower collar. The sleeves have a sleeve body. A circumferential collar, for example, is provided at one end or at both ends of the sleeve body. The collar is oriented outward from the sleeve body. In at least one embodiment of the present disclosure, the collar material is a uniform component of the sleeve or sleeve body.

In at least one embodiment of the present disclosure, a collar is able to be formed by a separate collar body, for example, a ring. The collar therefore represents an annular gradation from the outer surface of the cylindrical sleeve body. Within the scope of the present disclosure, however, one or more sleeves is able to have a polygonal shape.

In at least one embodiment of the present disclosure, a sleeve has a lower collar. With the lower collar at the lower end of the sleeve body, the sleeve rests on the inside of the second lower leg. The lower collar, for example, enlarges the contact area for joining with the second leg and improves its functionality.

Instead of a collar, a second fitting plate with the same function as the collar of the sleeve is able to be provided.

In at least one embodiment of the present disclosure, the sleeve with the sleeve body is able to be guided through the second opening in the second lower leg and the lower collar rests on the outside of the second leg.

A collar absorbs the friction and pressure forces that arise when tightening assembly elements guided through the sleeve or sleeve body, for example, screw fasteners. This is able to protect the surface of the components in the area of a screw connection from damage and reduce the surface pressure.

The legs of the hollow profile or the legs of the inner profile and/or the locking plate are able to have joining tabs. In at least one embodiment of the present disclosure, a plurality of spaced-apart joining tabs are provided in the longitudinal direction of the inner profile along longitudinal edge sections of the legs. The joining tabs protrude outwards. In at least one embodiment of the present disclosure, an alternating row of joining tabs is provided on each leg along its longitudinal edge section. The joining tabs are spaced apart from one another in the longitudinal direction of one leg, so that there are free spaces between the joining tabs. The locking plate is supported on the free ends or the longitudinal edge sections of the legs and/or on the joining tabs of the legs. The joining tabs are able to be set at an angle to a leg, wherein the joining tabs points outwards, for example, away from the free end of the legs. This improves accessibility for the production of spot welded connections.

The locking plate is able to have joining tabs or joining webs which are supported on the legs of the inner profile. In at least one embodiment of the present disclosure, the locking plate with joining webs lies against the joining tabs in some areas.

The locking plate is cohesively connected to the inner profile. This is done via a cohesive connection between the joining tabs of the inner profile and the joining webs of the locking plate. In at least one embodiment of the present disclosure, the cohesive connection between the joining tabs and the joining web takes place by means of a spot weld connection or spot weld bonding. These joining techniques ensure a low heat input into the components during cohesive joining. In principle, roll seam welding or laser welding are also possible.

In at least one embodiment of the present disclosure, installation elements are provided in the reinforcing structure. Installation elements are able to be load guide bodies, bulkhead plates, and similar internal reinforcing and/or functional components. Installation elements are arranged adjacent to inner struts provided in the battery pan. The installation elements are located in the reinforcement structure laterally in front of the inner struts, which extend in the battery pan between opposite side walls of the battery pan.

Installation elements are able to be formed as open or closed profile sheets and extend between the first leg and the second leg of the hollow profile and/or as a continuous load path from the locking plate to the inner profile. Internal reinforcement components are able to be designed as patches or local material doubling.

Furthermore, at least one support strut and/or one protective plate can be provided below the battery pan and/or below the reinforcement structure. These are able to perform different functions. In at least one embodiment of the present disclosure, they help to hold the battery weight, i.e., to bear the weight and/or load, or serve as additional protection, against penetration or tearing from below and as side crash protection.

The reinforcing structure is connected to the battery pan. For this purpose, the inner profile is joined to the battery pan. In at least one embodiment of the present disclosure, the inner profile with its rear web is joined against a side wall of the battery pan. The open inner profile is accessible from the side. The sleeves as well as other installation elements are able to be inserted and mounted in the open inner profile. During assembly, the sleeves are aligned and adjusted using the fitting plates. By adjusting the position of the sleeve in the hollow profile before the sleeve is joined, tolerances are compensated and the mounting points are positioned precisely. The sleeve or its sleeve body are able to be moved to a limited extent in the opening both in the longitudinal direction and in the transverse direction of the hollow profile or the reinforcement structure. The inclination of the sleeve's longitudinal axis relative to the vertical is able to be adjusted to a limited extent. The fitting plate covers the opening and fixes the position of the sleeve and thus the mounting point in its position. The fitting plate is joined to the leg in a material-locking manner. The fitting plate rests on the adjacent leg. In at least one embodiment of the present disclosure, the fitting plate rests on the outside of the first leg, i.e., the upper leg of the inner profile. The joint is made by a material bond between the fitting plate and the leg, for example, by welding.

After mounting the sleeves in the inner profile and, if necessary, installation elements, the open side of the inner profile is closed with one or more locking plates. This is done by means of a material bond, for example, by welding.

In addition to installation elements in the reinforcing structure, reinforcing or stiffening elements are able to be integrated in the battery pan. Such reinforcing or stiffening elements are able to be formed by longitudinal and/or transverse profiles or struts that extend on the tray floor.

In at least one embodiment of the present disclosure, a lid is able to form the upper end of the battery pan. The battery tray is able to be integrated into the body or chassis of a vehicle. The battery tray forms a supporting part of the body (cell-to-body). The floor of the vehicle is able to form the battery lid in this case.

The battery pan is a deep-drawn part made in one piece and of one material. The inner profile and/or the locking plate is able to be produced by press forming or deep drawing. Due to its U-shaped cross section, the inner profile has a channel-like course in which several sleeves are arranged at a distance from one another in the longitudinal direction. The at least one outer profile shifts the inner profile like a locking plate over at least part of its length. In this way, the inner profile and the locking plate form a hollow profile. Several locking plates are able to be provided in the longitudinal direction of the reinforcing structure. The one or more locking plates form the outer wall of the reinforcing structure.

The battery pan is able to be formed from a sheet metal plate by folding it to form the battery pan. For this purpose, a sheet metal plate is provided, the geometry of which corresponds to the development of the battery pan. A cooling plate is able to be joined directly to the sheet metal plate. Before this is then folded into the battery pan. The battery pan is designed as a folded component. Folded corners of the battery pan are joined and sealed.

The battery pan as well as the reinforcing structure and the components forming the reinforcing structure, for example, the inner profile and/or the locking plate, are able to be formed by hot stamping sheet steel. Hot stamping is also known as press hardening. During mold hardening, a sheet of manganese-boron steel is heated to a temperature above the specific austenitization temperature of the material, placed in a forming tool and warmly formed into a molded component, wherein the component cools during forming. Clamped in the forming tool, the molded components are hardened by cooling.

Coated steel sheets that are able to be hot stamped are able to be used here. In at least one embodiment of the present disclosure, these are manganese-boron steel sheets with an aluminum/silicon coating with a zinc alloy coating. The components of the reinforcing structure and the battery pan have tensile strengths of 1,000 MPa and higher.

The battery pan as well as the inner profile and/or the outer profile of the reinforcing structure are able to be made from extra-and ultra-high-strength cold-form steels. At least the outer profile then has a tensile strength of more than 980 MPa. In at least one embodiment of the present disclosure, the inner profile has a tensile strength of greater than or equal to 1,180 MPa.

Both the battery pan and the components of the reinforcement structure, for example, the inner profile and/or the outer profile, are able to be made from tailor-made sheets (tailored blanks). Tailored blanks of different sheet thicknesses and/or different material grades are able to be used. The use of components with tailor-made strength properties is also possible. Both the battery pan and the inner profile and/or the outer profile are able to have locally soft areas (soft zones). These measures serve to increase the transverse rigidity and improve crash performance, as well as, for example, to prevent cracks during welding or to adjust locally weakened zones with improved deformation capacity for energy absorption.

BRIEF DESCRIPTION OF THE DRAWINGS

The present disclosure is described in more detail hereinafter with reference to exemplary embodiments illustrated in the drawings. Showing

Figure 10:
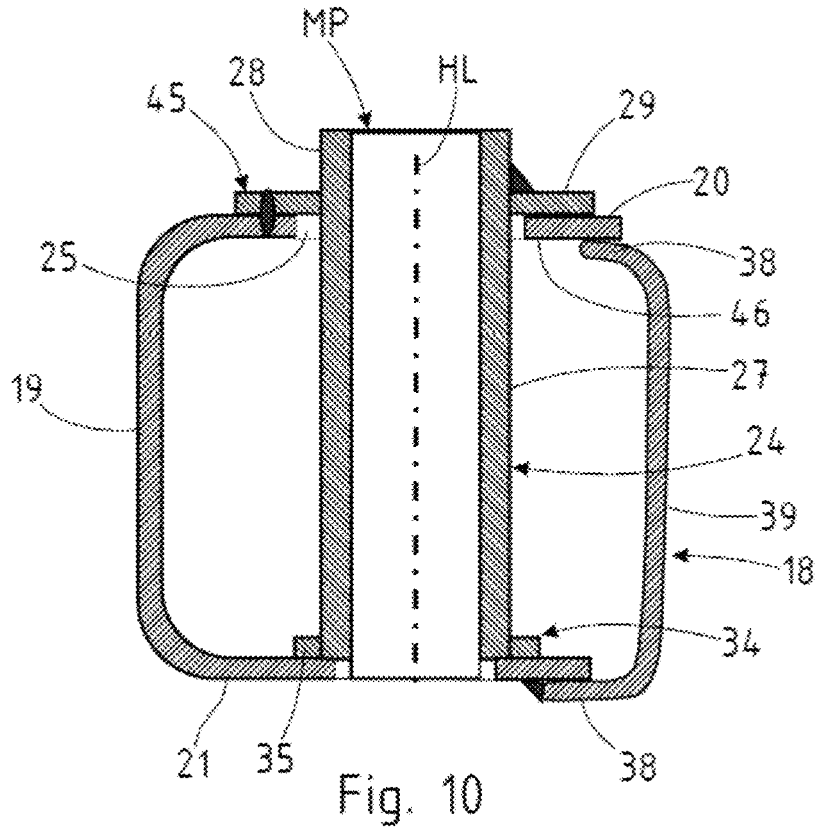
Figure 11:
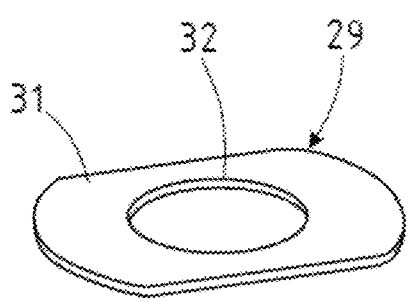
Figure 12:
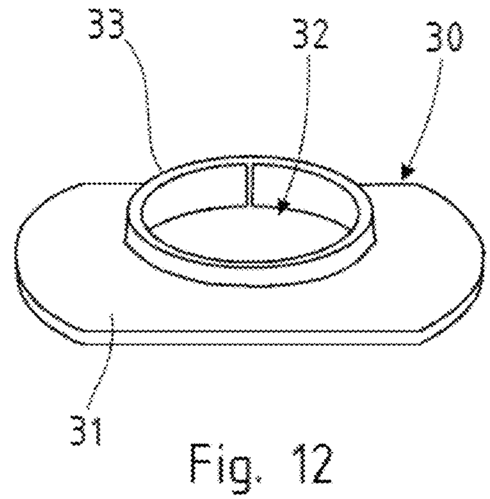
Figure 13:
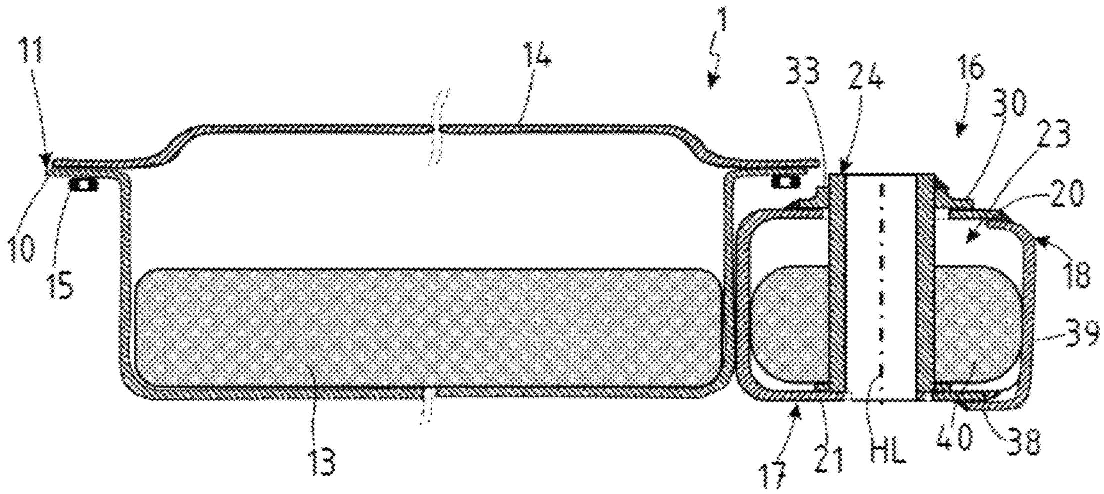
Figure 14:
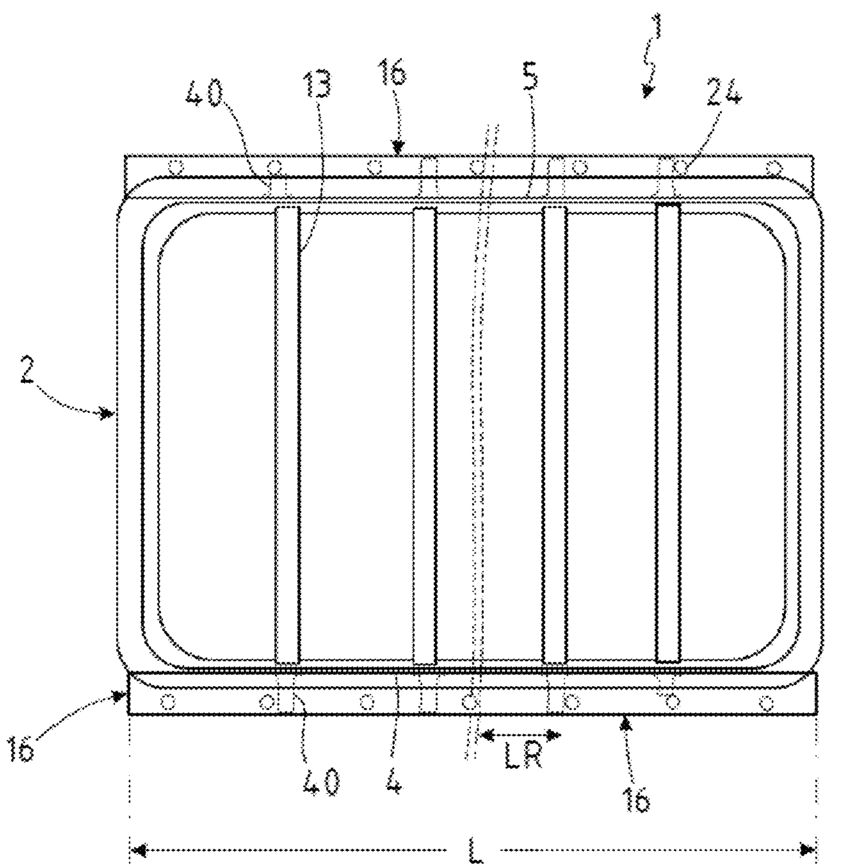

Fig. from 6 to FIG. 10 respectively a cross-section through a reinforcing structure in the area of a sleeve according to an embodiment of the present disclosure;

FIG. 11 a first embodiment of a fitting plate in a perspective view according to the present disclosure;

FIG. 12 a second embodiment of a fitting plate in a perspective view according to the present disclosure;

FIG. 13 shows a further embodiment of a battery tray according to the present disclosure in a cross-sectional view and FIG. 14 the battery tray as shown in FIG. 13 in a schematic top view according to an embodiment of the present disclosure.

DETAILED DESCRIPTION

In FIG. 1 to FIG. 14, the same reference numerals are used for identical or functionally corresponding components or component parts, even if a repeated description is omitted for reasons of simplicity.

Figure 1:
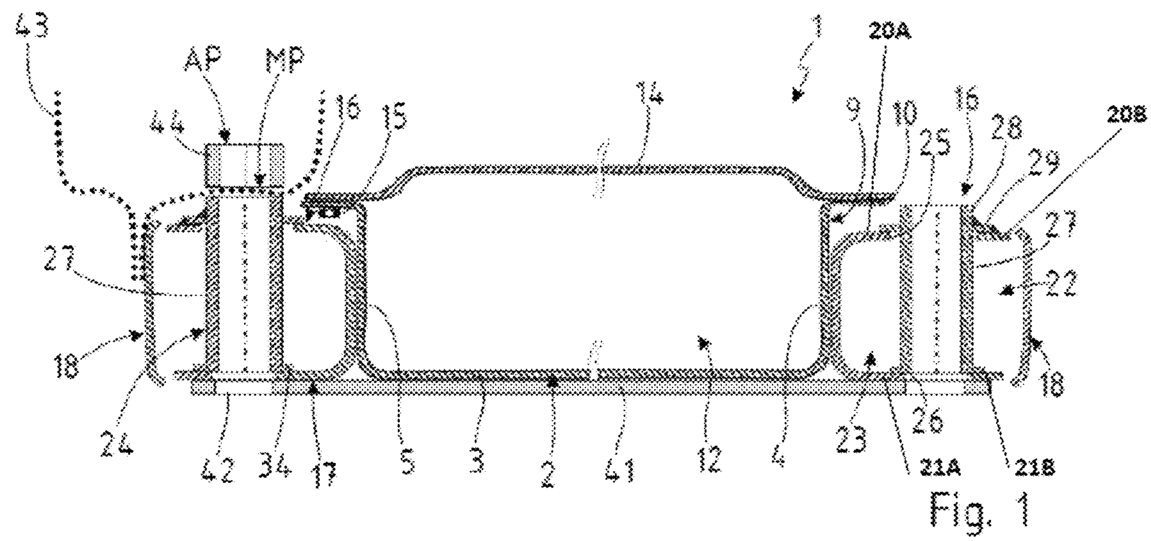
FIG. 1 shows a battery tray according to an embodiment of the present disclosure in a cross-sectional view.
Figure 2:
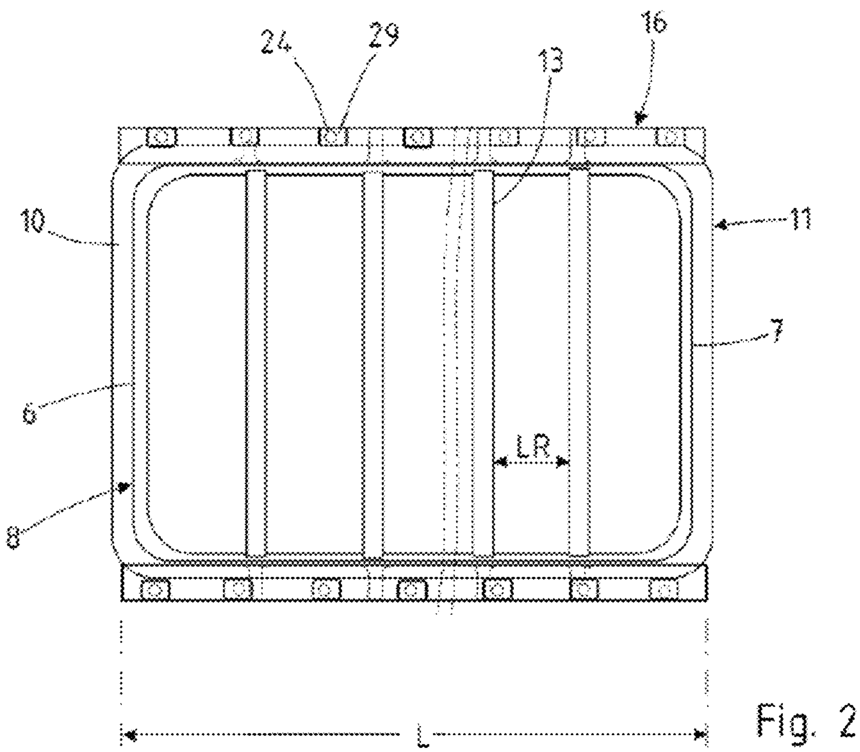
FIG. 2 shows the battery tray according to an embodiment of the present disclosure in a schematic top view.
Figure 3:
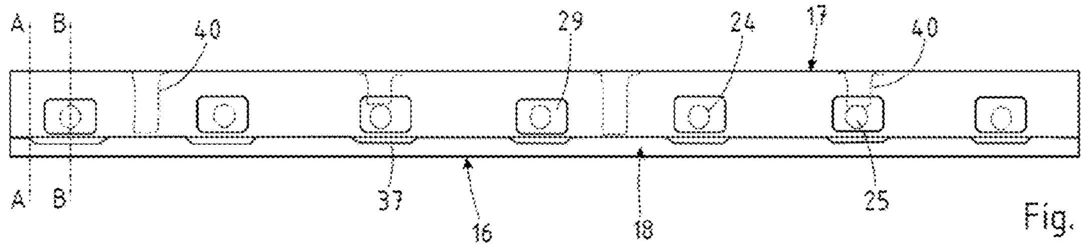
FIG. 3 shows a technically schematic top view of a reinforcing structure in an enlarged view according to an embodiment of the present disclosure.
Figure 4:
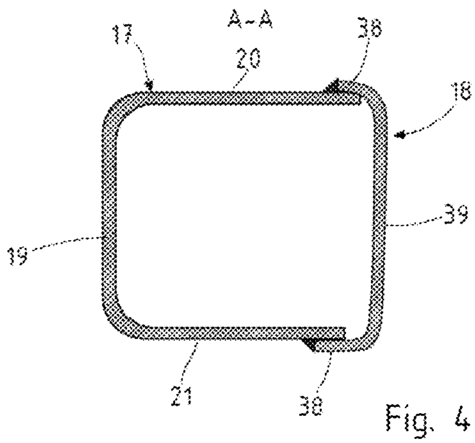
FIG. 4 a cross section through the reinforcing structure of the battery tray as shown in FIG. 3 along line A-A according to an embodiment of the present disclosure.
Figure 5:
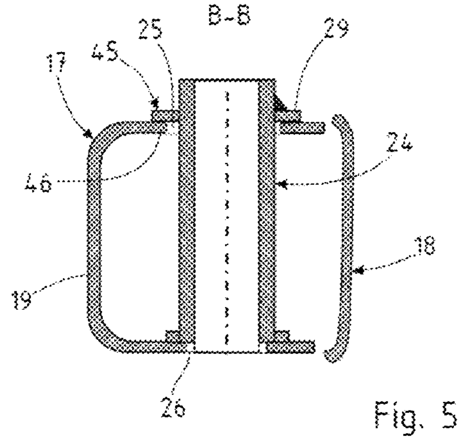
FIG. 5 a cross section through the reinforcing structure of the battery tray as shown in FIG. 3 along line B-B according to an embodiment of the present disclosure.

FIG. 1 to FIG. 3 as well as FIG. 13 and FIG. 14 show a battery tray 1 according to embodiments of the present disclosure.

The battery tray 1 has a battery pan 2 deep-drawn from sheet steel. The battery pan has a rectangular cross-section and has a tray base 3 and side walls, such as two longitudinal walls 4, 5 and two end walls 6, 7, which complement each other to form a circumferential tray wall 8. On the upper edge of the tray 9, outwardly directed flange sections 10 extend along the longitudinal walls 4, 5 and the end walls 6, 7, which are also closed all the way around to form an upper flange 11. The pan wall 8 delimits a pan interior 12 of the battery pan 2.

A plurality of inner struts 13 are arranged in the pan interior 12, optionally and as shown schematically in FIG. 2 and in FIG. 13 and FIG. 14. The inner struts 13 extend on the tray base 3 transversely between the longitudinal walls 4, 5 and are firmly secured in the battery pan 2.

The battery pan 2 is closed on the top side by a lid 14, which is mounted on the edge of the flange 11 with the incorporation of a circumferential seal not shown here. In the embodiments shown, the lid 14 is detachably connected to the battery pan 2 by means of screw connection means 15.

The battery tray 1 has a reinforcing structure 16. The reinforcing structure 16 extends on the outside of the battery pan 2 in front of the longitudinal walls 4, 5.

As shown in FIG. 1 and FIG. 4 and FIG. 5 and FIG. 6 to FIG. 10, a reinforcing structure 16 has an inner profile 17 and a locking plate 18. The inner profile 17 is configured with a U-shaped in cross section and has a rear web 19 as well as a first upper leg 20 and a second lower leg 21 and an open side 22. The legs 20, 21 of the inner profile 17 are directed away from the battery pan 2. The web 19 extends parallel to the side wall or a longitudinal wall 4, 5. The open side 22 of the inner profile 17 is closed at least in sections by the locking plate 18.

Both the inner profile 17 and the locking plate 18 are sheet metal parts that are formed from steel sheets. These are able to be form-hardened sheet steel components or cold-formed molded components made of, for example, ultra-high-strength (UHSS) cold-form steels.

The reinforcing structure 16 extends in the longitudinal direction LR of a longitudinal wall 4, 5. The inner profile 17 and the locking plate 18 form a hollow profile 23 at least over the majority of the length L of the reinforcing structure 16.

Several sleeves 24 are provided in the hollow profile 23 of the reinforcing structure 16. These extend vertically between the first leg 20 and the second leg 21 of the inner profile 17. A first opening 25 is provided in the first upper leg 20 and a second opening 26 is provided in the second lower leg 21. The openings 25, 26 are connected by the sleeves (see also FIG. 6 to FIG. 10). The sleeves 24 have a sleeve body 27 and protrude with a sleeve section 28 through the first upper opening 25. The top side of the first opening 25 is covered by a fitting plate 29, 30. The fitting plate 29, 30 has a passage 31. The sleeve 24 is joined to the sleeve portion 28 through the passage 31 and projects upwards relative to the first leg 20 of the inner profile 17.

Two embodiments of a fitting plate 29, 30 are shown in FIG. 11 and FIG. 12. The fitting plate 29 according to the illustration in FIG. 11 has a flat disk body 31 with the passage 32. The fitting plate 30 according to the illustration in FIG. 12 also has a flat disk body 31, wherein the passage 32 has a self-contained circumferential collar 33. The circumferential collar 33 in the fitting plate 30 is drawn in one piece from the disk body 31 in the manner of a pull-through. The semi-finished product for the production of a fitting plate 30 is able to be a disk body 31 as shown in FIG. 11.

A first opening 25 in the first leg 20 is able to be self-contained, i.e., be circumferentially delimited by an edge. Such an opening 25 is, for example, round. A round first opening 25 is shown in the embodiment according to the illustrations of FIG. 1, FIG. 5 and FIG. 7 to FIG. 10 and FIG. 13.

Figure 6:
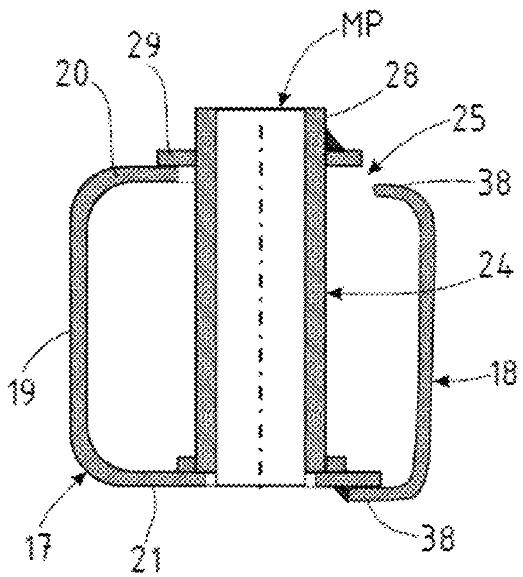

A first opening 25 in the first upper leg 20 is able to be open at the edge towards the front, towards the free end of the leg 20 and the outer profile 18. This is shown in FIG. 6. In this embodiment, the opening 25 is designed as a slot or elongated hole and is open at the free end of the leg 20.

At the lower end, the sleeves 24 have a lower collar 34. The collar 34 is able to be formed by a disc element 35. However, the collar 34 is also able to be formed into a sleeve 24 by a change at the lower end of the sleeve body 27. With the lower collar 34, a sleeve 24 rests on the inside of the second lower leg 21.

The fitting plates 29, 30 compensate for tolerances and adjust the position of a sleeve 24 in the hollow profile 23 before the sleeve 24 is joined and thus the final position of a mounting point provided or realized by the sleeve 24 is determined. The sleeves 24 are able to be displaced relative to the first opening 25 in the first leg 20 and relative to the second opening 26 in the second leg 21. The inclination of the sleeve longitudinal axis HL is able to be adjusted at an angle relative to a vertical. For this purpose, the fitting plate 29, 30 is able to be moved in the longitudinal direction and in the transverse direction of the reinforcement structure 16 on the first upper leg 20. After setting the correct position, the sleeve 24 is fixed. For this purpose, the fitting plate 29, 30 is joined, for example, welded, to the first leg 20 and the sleeve 24 in a material-locking manner.

The fitting plates 29, 30 cover the first opening 25 in the first upper leg 20 with an overlap 45. The fitting plate 29, 30 encloses the sleeve 24 or the sleeve section 28 and projects outwards to such an extent that the fitting plate 29, 30 projects beyond the edge 46 of the opening 25 and thus covers the opening 25. In the area of the overlap 45, the locking plate 29, 30 is then at least partially joined to the first leg 20.

Figure 7:
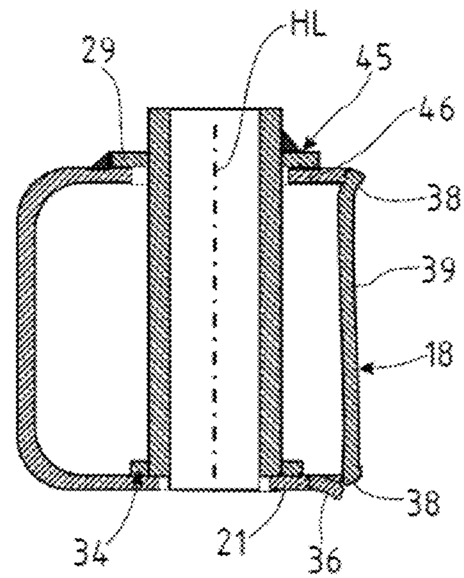
Figure 8:
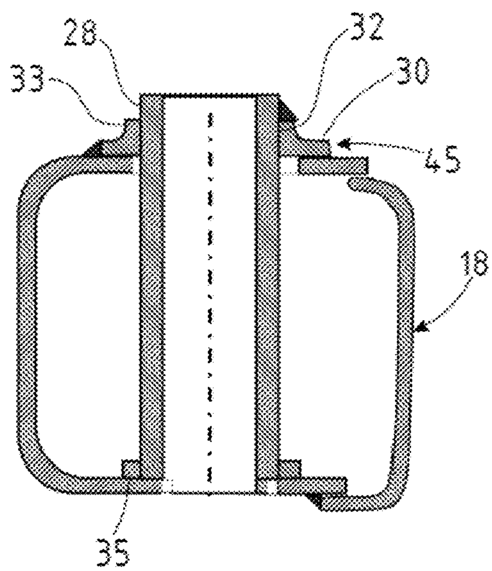
Figure 9:
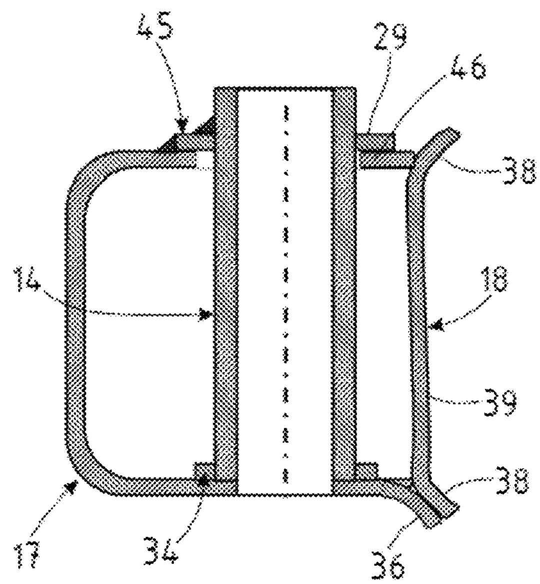

In the embodiment of the inner profile 17 according to the illustrations in FIG. 7 and FIG. 9, the first leg 20 and the lower leg 21 are able to have joining tabs 36. The joining tabs 36 extend outwards on longitudinal edge sections of a leg 20, 21. A plurality of joining tabs 36 are arranged alternately along the length of the inner profile 17. There are free spaces 37 between the individual joining tabs 36.

The locking plate 18 has joining webs 38. These each extend along the outer longitudinal edges of the locking plate 18. The locking plate 18 lies against the inner profile 17 with the joining webs 38 in the area of a joining tab 36. In the area of the free spaces 37, the locking plate 18 lies with the outer joining webs 38 against a respective leg 20, 21 of the inner profile 17 at its longitudinal edge.

The locking plate has an outer wall 39. The outer wall 39 runs vertically in cross-section, substantially parallel to the rear web 19 of the inner profile 17. A joining web 38 is provided on the upper and lower longitudinal edge of the locking plate 18. This is directed transversely to the outer wall 39.

In the embodiments of the locking plate 18 according to the illustrations in FIG. 1, FIG. 4, FIG. 5, FIG. 6, FIG. 8 and FIG. 13, the joining webs 38 are repositioned inwards towards the inner profile 17.

In the embodiments of the locking plate 18 according to the illustrations in FIG. 7 and FIG. 9, the joining webs 38 are directed outwards away from the ends of the first leg 20 and/or the second leg 21.

The installation of sleeves 24 as well as the assembly and fixing of installation elements is carried out from the outside with an open inner profile 17, before the locking plate 18 closes the open inner profile 17 in length. For this purpose, the locking plate 18 is cohesively joined to the inner profile 17, for example, by spot welding. This takes place between the joining tabs 36 and the joining webs 38.

The embodiment of the battery tray 2 as shown in FIG. 13 and FIG. 14 corresponds in basic structure to that described above. An installation element 40 is shown, which is installed in the hollow profile 23 or the inner profile 17 of the reinforcing structure 16. Such installation elements 40 are able to be, for example, load guide bodies or bulkhead plates. These are joined to the inner profile 17, for example, joined in a cohesive manner. Installation elements 40, which are configured in a hat shape and have different heights, are shown in the illustration in FIG. 3 as well as in FIG. 14.

A support strut 41 is able to be provided below the battery tray 2 and the reinforcing structure 16. This is shown in FIG. 1. In the embodiment shown, the support strut 41 has holes 42 which communicate with the lower openings 26 in the lower legs 21 and the sleeves 24. The support strut 41 is able to be designed as a plate or profiled.

In the left half of FIG. 1, a side sill 43 of a motor vehicle and the connection of the battery tray 1 to the motor vehicle are also shown. In the motor vehicle or the side sill 43, screwing points AP are provided in the form of threaded connections 44. The sleeves 24 provide the mounting points MP, via which the battery tray 1 is fixed to the motor vehicle by means of screw fasteners. The final setting of the mounting points MP and thus the adjustment between the screw-on points AP and the mounting points MP is carried out by setting and aligning the position of the sleeves 24 within the reinforcement structure 16 via the fitting plates 29, 30. To assemble the battery tray 1, screw fasteners are passed through the sleeves 24 and detachably coupled to threaded connections 44.

Instead of a side sill, another floor structure element of the motor vehicle to which the battery tray 1 is or able to be fixed, for example, further inner longitudinal members or a ladder frame longitudinal member.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A battery tray comprising:
a battery pan; and
a reinforcing structure, wherein the reinforcing structure has a hollow profile fixed to a side wall of the battery pan,
wherein the hollow profile comprises an inner profile having a first leg with a first opening and a second leg with a second opening, the first leg and the second leg are spaced apart from one another, and a sleeve extends between the first leg and the second leg and connects the first opening and the second opening,
wherein a passage is provided between the first leg and the second leg, and the sleeve extends through the passage.

2. The battery tray according to claim 1, further comprising a fitting plate covering the first opening or the second opening, wherein the fitting plate is adjustable on the first leg or the second leg so as to accommodate the sleeve in the inner profile before joining the sleeve to the inner profile.

3. The battery tray according to claim 2, wherein the fitting plate rests on an outside of the first leg or the second leg, the outside being exterior of the hollow profile.

4. The battery tray according to claim 2, wherein the fitting plate covers the first opening or the second opening at an edge of the first leg or the second leg with an overlap.

5. The battery tray according to claim 1, further comprising a collar overlapping an edge of the first leg or the second leg.

6. The battery tray according to claim 5, wherein the collar projects outwards and away from the hollow profile.

7. The battery tray according to claim 5, further comprising a fitting plate, wherein the fitting plate rests on an inside of the first leg or the second leg.

8. The battery tray according to claim 1, wherein the reinforcing structure further comprises an outer profile, the inner profile comprising a U-shaped cross-section with a web, the first leg and the second leg extend away from the battery pan, and the inner profile is closed by the outer profile at least in longitudinal sections thereof.

9. The battery tray according to claim 1, wherein the sleeve is guidable with an upper sleeve section through the first opening, and the upper sleeve section protrudes from an outer side of the first leg; or the sleeve is guidable with a lower sleeve section through the second opening, and the lower sleeve section protrudes from an outer side of the second leg.

10. The battery tray according to claim 1, wherein the sleeve comprises an upper collar or a lower collar.

11. The battery tray according to claim 10, wherein the lower collar stands on an inside of the second leg or rests on an outside of the second leg.

12. The battery tray according to claim 1, wherein built-in elements are in the reinforcing structure.

13. The battery tray according to claim 1, wherein at least one support strut or a protective plate is underneath the battery pan or the reinforcing structure.

14. The battery tray according to claim 1, wherein a first fitting plate covers the first opening and a second fitting plate covers the second opening.

15. A battery tray comprising:

a battery pan having side walls; and a reinforcing structure, wherein the battery tray is configured to be attached, via fastener, to a body or chassis of a vehicle, the reinforcing structure has a hollow profile on an outside of the side walls of the battery pan, the hollow profile has a first leg with a first opening and a second leg with a second opening, the first leg and the second leg are spaced apart and connected by a strut, wherein a sleeve extends between the first leg and the second leg to connect at least one of the first opening and the second opening, the sleeve is configured to receive a screw fastener, wherein a fitting plate with a passage is provided, the fitting plate covers the first opening or the second opening, and the sleeve protrudes through the passage of the fitting plate.

* * * * *